United States Patent
Sugimoto et al.

(10) Patent No.: US 7,821,568 B2
(45) Date of Patent: *Oct. 26, 2010

(54) IMAGING DEVICE, AUTOMATIC FOCUSING METHOD AND RECORDING MEDIUM ON WHICH A PROGRAM IS RECORDED

(75) Inventors: Masahiko Sugimoto, Asaka (JP); Yoshiharu Gotanda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 481 days.

This patent is subject to a terminal disclaimer.

(21) Appl. No.: 11/604,348

(22) Filed: Nov. 27, 2006

(65) Prior Publication Data
US 2007/0070238 A1   Mar. 29, 2007

Related U.S. Application Data

(62) Division of application No. 09/737,968, filed on Dec. 18, 2000, now Pat. No. 7,242,434.

(30) Foreign Application Priority Data
Jan. 24, 2000 (JP) .............................. 2000-14794

(51) Int. Cl.
H04N 5/232 (2006.01)
G03B 13/00 (2006.01)

(52) U.S. Cl. ........................................ 348/349; 348/345

(58) Field of Classification Search ......... 348/345–353, 348/357, 361
See application file for complete search history.

(56) References Cited

U.S. PATENT DOCUMENTS

| 5,815,748 | A | * | 9/1998 | Hamamura et al. | 396/104 |
| 6,091,452 | A | * | 7/2000 | Nishiyama | 348/349 |
| 6,704,054 | B1 | | 3/2004 | Hashimoto | |
| 2001/0050718 | A1 | | 12/2001 | Ito | |
| 2002/0154241 | A1 | | 10/2002 | Ohkawara | |

FOREIGN PATENT DOCUMENTS

| JP | 5-216093 | 8/1993 |
| JP | 622259 | 1/1994 |
| JP | 406167649 | 6/1994 |
| JP | 8160287 | 6/1996 |
| JP | 8-171046 | 7/1996 |
| JP | 8-304696 A | 11/1996 |
| JP | 9179014 | 7/1997 |
| JP | 10048512 A | 2/1998 |

(Continued)

Primary Examiner—Kelly L Jerabek
(74) Attorney, Agent, or Firm—Birch, Stewart, Kolasch & Birch, LLP (57) ABSTRACT

An imaging device that can shorten focus searching search times and enable correct focusing in accordance with shooting conditions. An autofocus function operates when a shutter button of a digital camera is half-pressed. At this time, a current shooting mode, which was selected in advance by a photographer operating a variety of buttons, is acquired. In accordance with the acquired shooting mode, a focusing lens moves to a search start position. Also, a direction in which the focusing lens will move is decided in accordance with the shooting mode. The focusing lens is moved and an in-focus position is thereby found. Then the focusing lens is adjusted to the in-focus position.

25 Claims, 9 Drawing Sheets

FOREIGN PATENT DOCUMENTS

| | | |
|---|---|---|
| JP | 10142488 A | 5/1998 |
| JP | 10-232343 A | 9/1998 |
| JP | 10-233962 | 9/1998 |
| JP | 11069225 A | 3/1999 |
| JP | 11-153750 | 6/1999 |

* cited by examiner

AUTOFOCUS AREA

FIG. 4B

AUTOFOCUS AREA

FIG. 4C

AUTOFOCUS AREA

FIG. 4D

AUTOFOCUS AREA

F I G. 7

IMAGING DEVICE, AUTOMATIC FOCUSING METHOD AND RECORDING MEDIUM ON WHICH A PROGRAM IS RECORDED This application is a Divisional of application Ser. No. 09/737,968 filed on Dec. 18, 2000 now U.S. Pat. No. 7,242, 434, and for which priority is claimed under 35 U.S.C. §120; and this application claims priority of Application No. 2000-14794 filed in Japan on Jan. 24, 2000 under 35 U.S.C. §119; the entire contents of all are hereby incorporated by reference.

BACKGROUND OF THE INVENTION

1. Field of the Invention

The present invention relates to an imaging device, and more particularly, to an imaging device provided with an autofocus function that automatically performs focus adjustment of an imaging device such as a digital camera or the like.

2. Description of the Related Art

In recent years digital cameras have been commonly used as imaging devices for photographing subjects. A conventional digital camera (such as a digital still camera or digital video camera) generally acquires an image by using an imaging element such as a CCD or the like, and records the image as digital image data in an internal memory or IC card provided inside the camera or on a recording medium such as a magnetic tape or the like. The image can then, on the basis of the recorded image data, be recorded onto recording paper by a printer. Also, the image acquired by imaging can be displayed on a monitor. Moreover, it is known that many of these digital cameras are provided with liquid crystal monitors. With a digital camera that is provided with a liquid crystal monitor, a photographed image can be directly displayed on the liquid crystal monitor.

In an imaging device such as the above-described digital camera, a lens is provided for the purpose of focusing a subject image onto the imaging element when a subject is being photographed. By controlling focusing of the lens, a focusing distance can be aligned with the subject. Consequently, imaging devices provided with autofocus functions for automatically aligning focusing distances with subjects have been conventionally suggested.

However, autofocus functions in conventional imaging devices perform focusing on the basis of contrast values calculated from density data that has been input from the imaging element (CCD or the like). Therefore, these autofocus functions work for usual photography but sometimes do not function properly for situations such as close-up shooting, shooting in low ambient light levels and the like.

Accordingly, a technique, described in Japanese Patent Application Laid-Open (JP-A) No. 8-160287, has been suggested in which an imaging device has a macro mode and a normal mode. A focusing lens is moved in a predetermined manner in accordance with switching of these modes. Then a photograph is taken.

Further, a technique described in JP-A Nos. 6-22259 and 9-179014 has been suggested. In this technique, focusing distance is not automatically adjusted by an autofocus function in low lightness conditions; that is, conditions in which adjusting the focusing distance is difficult. Rather, in such conditions the focusing distance is predeterminedly set to infinity (so-called preset focus).

However, conventional imaging devices have a problem with focus searches taking a long time. For example, if an in-focus position is a position far from a focus search start position, the autofocus function must search through almost the whole of a focus search range.

Moreover, in cases in which adjusting the focusing distance is difficult, the focusing distance is not automatically adjusted but is predeterminedly set to infinity. Therefore, in cases such as close-up shooting, shooting in low ambient light levels and the like, this predetermined infinity focus setting may not be reasonable, which is a problem.

SUMMARY OF THE INVENTION

The present invention is provided to solve the above-described problems and an object of the present invention is to provide an imaging device that can shorten focus searching search times and that can perform focusing correctly in accordance with photographic conditions.

In order to achieve the above-described objectives, a first aspect of the present invention is a device for forming an image of a subject, the device including: (a) a focusing lens having an optical axis, with the focusing lens being movable along the optical axis for focusing an image of the subject at an imaging position; (b) a motor connected to the focusing lens, operable for causing the focusing lens to move along the optical axis; (c) an image sensor having a sensing surface located at the imaging position, which produces electronic information in accordance with images on the sensing surface; and (d) a central processing unit electronically connected to the image sensor and receiving electronic information from the image sensor, and electronically connected to and controlling the motor, the central processing unit having a memory and program logic, in which the program logic in accordance with predetermined conditions stored in the memory, determines a start point of a search for an in-focus position of an image of the subject on the imaging position, and controls operation of the motor to move the focusing lens to the start point, and to move the focusing lens from the start point until an in-focus position is reached based on analyzing electronic information received from the image sensor.

In the first aspect of the present invention, the focusing lens is focused on the imaging position of the subject by being moved along the optical axis direction. The focusing lens is moved by the driving device. A focusing position is adjusted by movement of the focusing lens. When the in-focus position is to be searched for, a focus search start position is determined by the control device in accordance with the predetermined conditions (e.g. shooting conditions such as ambient lightness, photographic range and the like), and controls the driving device to adjust the focusing lens. That is, when the in-focus position is to be searched for, the focus search start position is determined in accordance with the predetermined conditions. For example, in close-up shooting, an in-focus position search can be performed with the focus search start position being at a close position end of the focusing range, and the in-focus position can be found in a short time. Hence, focus searching search times can be shortened.

A second aspect of the present invention is the device of the first aspect, wherein the focusing lens is movable forward and back along the optical axis, and the program logic determines, in accordance with the predetermined conditions, to search one of forward and back from the start point along the optical axis for an in-focus position.

Long-range shooting is common during shooting of night scenes, landscapes and the like. Accordingly, the in-focus position is at a far position. Therefore, the in-focus position search can be done in a shorter time if a start position thereof is at a far position end of the focusing range and the search moves toward the close position end. Thus, in the second aspect of the present invention, the direction of the in-focus position search performed by the invention of the first aspect is determined by the controller in accordance with the predetermined conditions. Thus, the in-focus position search can be performed in a short time. Hence, focus searching search times can be shortened.

Further, the direction of the search may be determined by selecting, in accordance with the predetermined conditions, one of two ends of a movement range of the focusing lens as the search start position.

A third aspect of the present invention is the device of the first aspect, wherein the program logic determines, in accordance with the predetermined conditions, a range for the search.

Depending on the position of the subject, close-up shooting and the like, the in-focus position may be assumed to be within a predetermined range. Thus, in the third aspect of the present invention, the range of the search to be performed by the invention of the first aspect is determined by the controller, and the search range can be reduced. Hence, by reduction of the search range, search times can be shortened.

A fourth aspect of the present invention is the device of the first aspect, wherein the program logic determines, in accordance with the predetermined conditions, a method of determination of an in-focus position.

There may be cases in which judgement of focus is difficult, depending on ambient lightness and range. Thus, in the fourth aspect of the present invention, a method for determination of focus in the invention of the first aspect is decided by the control device in accordance with the predetermined conditions. Hence, an appropriate focusing judgement can be made. That is, an imaging device capable of focusing appropriately in response to shooting conditions can be provided.

A fifth aspect of the present invention is the device of the first aspect, wherein, when the search for an in-focus position is unsuccessful, the program logic, in accordance with the predetermined conditions, controls the motor to move the focusing lens to a focusing position stored in advance in the memory.

There will be cases in which the control device cannot find the in-focus position. For example, it may not be possible to find the in-focus position in such cases as night scenes with low ambient lightness, landscapes with little contrast and the like. Thus, in the fifth aspect of the present invention, when the control device of the invention of the first aspect cannot find the in-focus position, the control device controls the driving device to move the focusing lens to a pre-fixed focusing position in accordance with the predetermined conditions. That is, by setting, in accordance with the predetermined conditions, a pre-fixed focusing position as the focusing position, focusing can be performed appropriately.

A sixth aspect of the present invention is the device of the first aspect, wherein the predetermined conditions are photographic modes including at least a close-up mode, a landscape mode and a night scene mode.

In the sixth aspect of the present invention, the predetermined conditions of the first aspect of the present invention may be shooting modes such as the close-up mode (macro mode), the landscape mode, the night scene mode and the like. There may also be other shooting modes; for example, a wide-angle mode for wide-angle photography.

A seventh aspect of the present invention is a focusing method for use in an imaging device for focusing an image of a subject at an imaging position using a focusing lens movable along an optical axis, the method including: (a) determining, in accordance with predetermined conditions, a start point from which to move the focusing lens along the optical axis in searching for an in-focus position; (b) positioning the focusing lens at the start point; and (c) moving the focusing lens along the optical axis from the start point, searching for an in-focus position.

In the seventh aspect of the present invention, as described for the first aspect, when the in-focus position is to be searched for, the focus search start position is determined in accordance with the predetermined conditions (e.g. shooting conditions such as ambient lightness, shooting range and the like). The in-focus position search starts from this search start position. Thus, the in-focus position can be found in a short time. Hence, focus searching search times can be shortened.

An eighth aspect of the present invention is the focusing method of the seventh aspect, further including determining, in accordance with the predetermined conditions, a direction to search from the start point along the optical axis for an in-focus position.

Similarly to the second aspect, in the eighth aspect of the present invention, the direction of the in-focus position search by the invention of the seventh aspect is determined in accordance with predetermined conditions. Thus, the in-focus position search can be performed in a short time. Hence, focus searching search times can be shortened.

Further, the direction of the search may be determined by selecting, in accordance with the predetermined conditions, one of the two ends of the movement range of the focusing lens as the search start position.

A ninth aspect of the present invention is the focusing method of the seventh aspect, further including determining, in accordance with the predetermined conditions, a range for the search.

Similarly to the third aspect, the ninth aspect of the present invention determines the range of the search to be performed by the invention of the seventh aspect, and the search range can be reduced. Hence, by reduction of the search range, search times can be shortened.

A tenth aspect of the present invention is the focusing method of the seventh aspect, further including determining, in accordance with the predetermined conditions, a method for deciding whether an in-focus position has been reached.

Similarly to the fourth aspect, in the tenth aspect of the present invention a method for determination of focus in the invention of the seventh aspect is decided in accordance with the predetermined conditions. Hence, an appropriate focusing judgement can be made. That is, an imaging device capable of focusing appropriately in response to shooting conditions can be provided.

An eleventh aspect of the present invention is the focusing method of the seventh aspect, wherein, if the search for an in-focus position is unsuccessful, the focusing lens is moved, in accordance with the predetermined conditions, to a default focusing position.

Similarly to the fifth aspect, in the eleventh aspect of the present invention, when the controller of the invention of the seventh aspect cannot find the in-focus position, the focusing lens is moved to a pre-fixed focusing position in accordance with the predetermined conditions. That is, by setting, in accordance with the predetermined conditions, the pre-fixed focusing position as the focusing position, focusing can be performed appropriately.

A twelfth aspect of the present invention is the focusing method of the seventh aspect, wherein the predetermined conditions are photographic modes including at least a close-up mode, a landscape mode and a night scene mode.

In the twelfth aspect of the present invention, the predetermined conditions of the seventh aspect of the present invention may be shooting modes such as the close-up mode (macro mode), the landscape mode, the night scene mode and the like. There may also be other shooting modes; for example, a wide-angle mode for wide-angle photography.

A thirteenth aspect of the present invention is a computer program product for use in focusing an image of a subject at an imaging position in an imaging device having a computer, wherein the computer controls movement of a focusing lens along an optical axis, the product including a recording medium having recorded thereon electronically readable information which, when used to program the computer, causes the computer to: (a) determine, in accordance with predetermined conditions, a start point from which to move the focusing lens along the optical axis in searching for an in-focus position; (b) position the focusing lens at the start point; and (c) move the focusing lens along the optical axis from the start point, searching for an in-focus position.

Similarly to the first and seventh aspects, in the thirteenth aspect of the present invention, when the in-focus position is to be searched for, the focus search start position is determined in accordance with the predetermined conditions (e.g. shooting conditions such as ambient lightness, photographic range and the like). The in-focus position search starts from this search start position. Thus, the in-focus position can be found in a short time. Hence, focus searching search times can be shortened.

A fourteenth aspect of the present invention is the computer program product of the thirteenth aspect, wherein the electronically readable information, when used to program the computer, further causes the computer to determine, in accordance with the predetermined conditions, a direction to search from the start point along the optical axis for an in-focus position.

Similarly to the second and eighth aspects, in the fourteenth aspect of the present invention, the direction of the in-focus position search is determined in accordance with the predetermined conditions. Thus, the in-focus position search can be performed in a short time. Hence, focus searching search times can be shortened.

Further, the direction of the search may be determined by selecting, in accordance with the predetermined conditions, one of the two ends of the movement range of the focusing lens as the search start position.

A fifteenth aspect of the present invention is the computer program product of the thirteenth aspect, wherein the electronically readable information, when used to program the computer, further causes the computer to determine, in accordance with the predetermined conditions, a range for the search.

Similarly to the third and ninth aspects, the fifteenth aspect of the present invention determines the range of the search to be performed by the invention of the thirteenth aspect, and the search range can be reduced. Hence, by reduction of the search range, search times can be shortened.

A sixteenth aspect of the present invention is the computer program product of the thirteenth aspect, wherein the electronically readable information, when used to program the computer, further causes the computer to determine, in accordance with the predetermined conditions, a method for deciding whether an in-focus position has been reached.

Similarly to the fourth and tenth aspects, in the sixteenth aspect of the present invention a method for determination of focus in the invention of the thirteenth aspect is decided in accordance with the predetermined conditions. Hence, an appropriate focusing judgement can be made. That is, an imaging device capable of focusing appropriately in response to shooting conditions can be provided.

A seventeenth aspect of the present invention is the computer program product of the thirteenth aspect, wherein the electronically readable information, when used to program the computer, if the search for an in-focus position is unsuccessful, includes causing the computer, in accordance with the predetermined conditions, to move the focusing lens to a default focusing position.

Similarly to the fifth and eleventh aspects, in the seventeenth aspect of the present invention, when the controller of the invention of the thirteenth aspect cannot find the in-focus position, the focusing lens is moved to a pre-fixed focusing position in accordance with the predetermined conditions. That is, by setting, in accordance with the predetermined conditions, a pre-fixed focusing position as the focusing position, focusing can be performed appropriately.

An eighteenth aspect of the present invention is the computer program product of the thirteenth aspect, wherein the predetermined conditions are photographic modes including at least a close-up mode, a landscape mode and a night scene mode.

In the eighteenth aspect of the present invention, the predetermined conditions of the thirteenth aspect of the present invention may be shooting modes such as the close-up mode (macro mode), the landscape mode, the night scene mode and the like. There may also be other shooting modes; for example, a wide-angle mode for wide-angle photography.

DESCRIPTION OF THE PREFERRED EMBODIMENTS

An example of a preferred embodiment in accordance with the present invention is explained in detail below, with reference to the drawings. The present embodiment is a digital camera in which the present invention is applied.

Figure 1A:
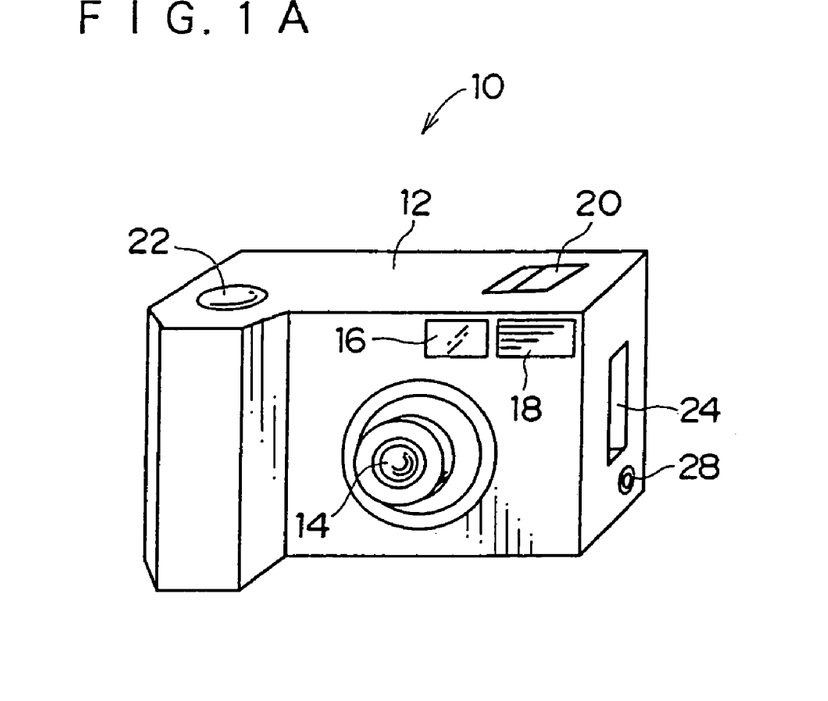
FIG. 1A is a front view of a digital camera relating to the embodiment of the present invention.
Figure 1B:
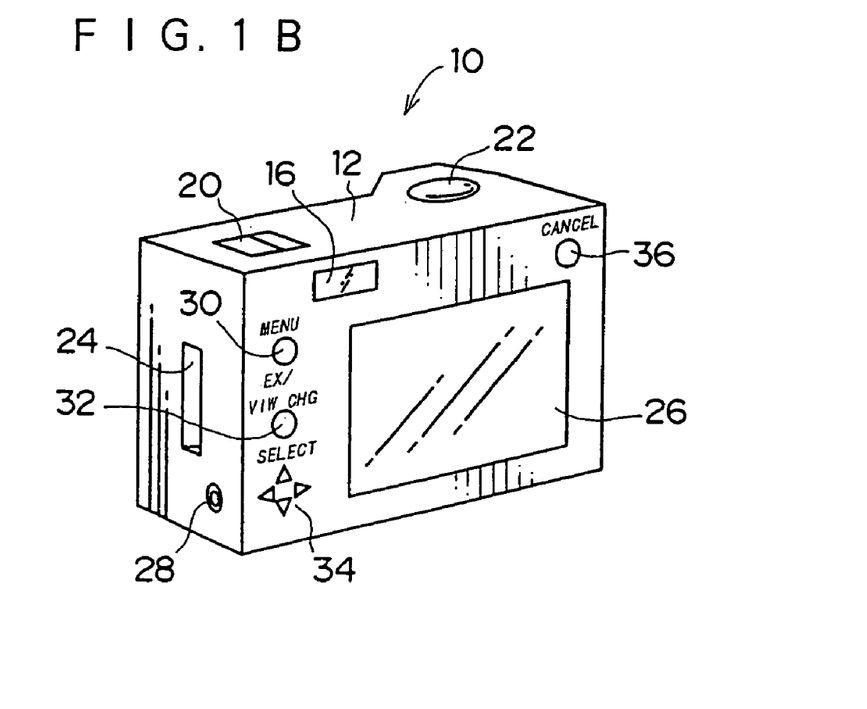
FIG. 1B is a rear view of the digital camera relating to the embodiment of the present invention.

FIGS. 1A and 1B show exterior views of a digital camera relating to the present embodiment.

As shown in FIGS. 1A and 1B, a body 12 of a digital camera 10 is substantially box-shaped. At a left side, looking from the front of the body 12, the body 12 is shaped to have a protrusion (gripping portion) which is formed to facilitate gripping of the body 12. A lens 14 is attached at the center of a front face of the body 12. An optical viewfinder 16, for a user to visually confirm photographic frame size and the like, and a flash 18, for emitting auxiliary light in low light conditions or the like, are fitted to the body 12 above the lens 14.

A power switch 20 is provided at a top face of the body 12, at the right side looking from the front. A shutter button 22 is provided at the left side of the same face. A slot 24, in which a memory card (not shown) can be mounted, is provided at a side face, which is at the right side looking from the front.

An AC adapter connection socket 28 is provided below the slot 24. An AC adapter for obtaining power from an AC power supply connects to the AC adapter connection socket 28. Thus, the digital camera 10 is structured such that AC power can be supplied thereto.

As shown in FIG. 1B, a color display 26 is provided at a back face of the body 12. The color display 26 is formed of translucent liquid crystals (semi-translucent liquid crystals are also acceptable). The color display 26 is provided with a backlight formed by a fluorescent tube, LED or the like. The display 26 includes the function of the viewfinder 16.

A MENU button 30, an EX/VIEW CHG button 32 and SELECT buttons 34 are respectively provided at the left side (looking forward) of the back face of the body 12. A CANCEL button 36 is also provided at the back face, above the display 26. The SELECT buttons 34 are keys for selecting a mode or the like from a menu screen or the like, which is displayed when the MENU button 30 has been pressed. The CANCEL button 36 is a key for cancelling various modes and the like.

Figure 2A:
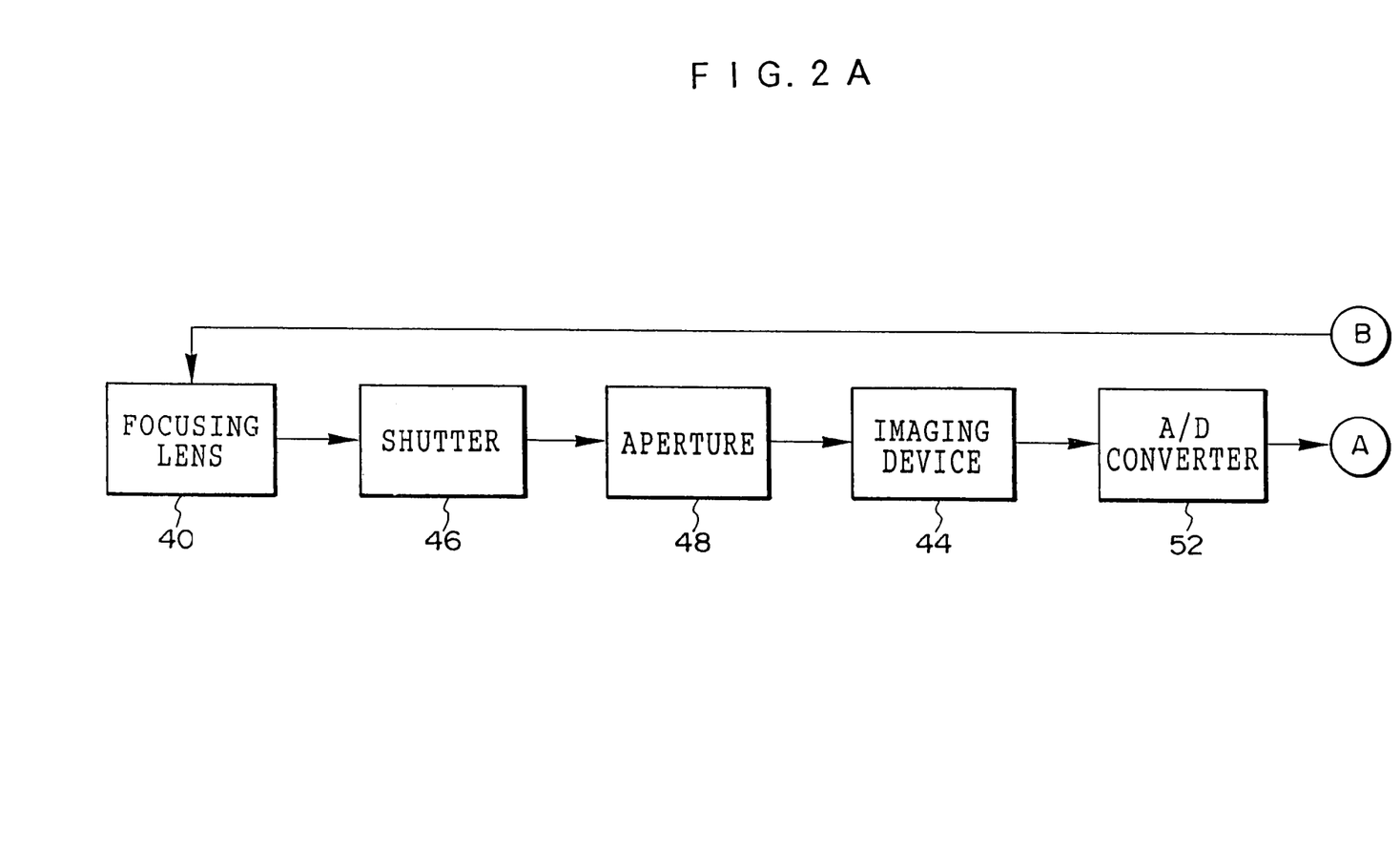
FIGS. 2A and 2B are a block diagram showing an electronic system of the digital camera relating to the embodiment of the present invention.
Figure 2B:
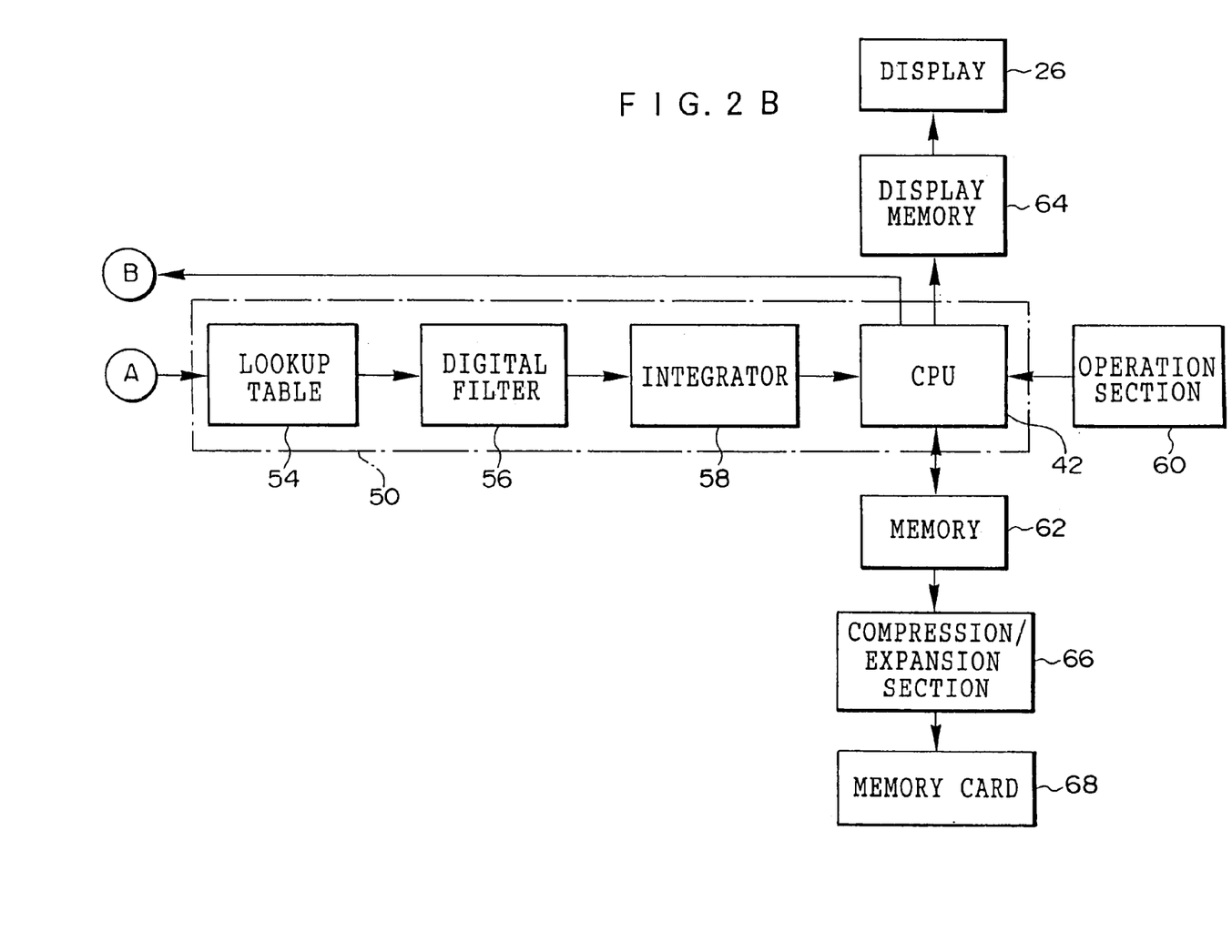

FIGS. 2A and 2B show a block diagram that illustrates schematic structure of an electronic system of the digital camera 10. The lens 14 is, to be specific, a zoom lens (variable focusing distance lens) equipped with an autofocus function. The autofocus function and zoom mechanism of the lens 14 are driven by an unillustrated drive circuit. A fixed focusing distance lens that is equipped only with the autofocus function may be used instead of the zoom lens.

Focusing adjustment of the autofocus function is carried out by moving a focusing lens 40 (shown in FIG. 2A). A drive device, which is a stepper motor or the like for moving the focusing lens 40, is step-driven by control from a CPU 42 and performs the focusing adjustment.

Inside the body 12, an imaging device 44 is disposed at a position corresponding to a focal point of the lens 14. The imaging device 44 is formed by an area CCD sensor or the like. Light reflected from a subject and incident through the lens 14 forms an image at a light receiving surface of the imaging device 44. Drive timing of the imaging device 44 is driven by the aforementioned drive circuit, and the imaging device 44 outputs image signals (signals representing respective light amounts at a mutiplicity of light conversion cells, which are arrayed in matrix form at the light receiving surface).

A shutter 46 and an aperture 48 are disposed between the lens 14 and the imaging device 44. The shutter 46 and the aperture 48 are driven by the drive circuit. The shutter 46 is present to prevent smearing from being caused by light incident on the light receiving surface of the imaging device 44 when the imaging device 44 outputs the image signals. The shutter 46 may be omitted, depending on the form of the imaging device 44. The aperture 48 may be formed by a single aperture with a continuously variable aperture value, or may be formed by a plurality of switchable apertures with different aperture values. The autofocus function is operated by a half-press action at the shutter button 22.

The signals outputted from the imaging device 44 are converted to digital data by an A/D converter 52 and inputted to a control section 50 that performs focus control (focusing adjustment). The control section 50 is provided with a lookup table 54, a digital filter 56, an integrator 58 and the CPU 42. At the lookup table 54, autofocus control values, which control the autofocus function, are fixed on the basis of contrast information obtained from the image signals outputted from the imaging device 44. The digital filter 56 removes noise components from the autofocus control values provided by the lookup table 54. The integrator 58 calculates integrated values (autofocus evaluation values) from the autofocus control values that have been filtered by the digital filter 56. The integrator 58 outputs calculation results to the CPU 42, which includes unillustrated peripheral circuits such as a ROM, a RAM, an input/output port and the like.

In response to the autofocus evaluation values calculated by the integrator 58, the CPU 42 controls the drive device (the stepper motor or the like) to move the position of the focusing lens 40. Thus, the CPU 42 automatically performs focusing with respect to a subject image.

An operation section 60 is connected to the CPU 42. The operation section 60 includes various buttons for carrying out operation of the digital camera 10, such as the power switch 20, the MENU button 30, the EX/VIEW CHG button 32, the SELECT buttons 34, the CANCEL button 36 and the like. The CPU 42 controls the digital camera 10 in accordance with operation information that is inputted at the operation section 60. The operation information that is inputted at the operation section 60 includes a variety of shooting modes, such as automatic photography (autofocus, auto-exposure, etc.), manual photography, continuous shooting, action shooting, portrait shooting, landscape shooting, night shooting, flash photography and the like. Photographic modes are not limited to the above shooting modes. Examples thereof, besides the above shooting modes, include a telephoto mode for telephoto (zoom) photography, a wide-angle mode for wide-angle photography, and the like.

Various corrections, such as white balance correction, are performed on image data outputted from the imaging device 44. Then a variety of other processes such as color correction, gamma correction, Y/C conversion and the like are performed on the data, and the data is temporarily stored in a memory 62, which is formed by a RAM or the like, and in a display memory 64.

If there is a plurality of image data sets stored in the display memory 64, an image data set is selected by operation of the SELECT buttons 34 and the like. A predetermined process is performed on selected image data, which is then transferred to the display 26. Thus, an image represented by image data that has been temporarily stored in the display memory 64 is shown on the display 26.

When an instruction to save image data to a memory card 68 mounted in the slot 24 is given (after operation of the shutter button 22 or the like), the CPU 42 reads the image data that has been temporarily stored in the memory 62 and transfers the image data to a compression/expansion section 66. Hence, the image data is compressed by the compression/expansion section 66 and saved to the memory card 68. Depending on the shooting mode and the like, there may also be cases in which the image data is saved to the memory card 68 without being compressed.

When an instruction to play back (display) an image represented by image data that has been saved to the mounted memory card 68 is given, the image data is read out from the memory card 68, expanded (decompressed) by the compression/expansion section 66 and temporarily stored in the display memory 64. Then, using the image data that has been temporarily stored in the display memory 64, the image is displayed (played back) on the display 26.

Now, the autofocus function will be explained. The digital camera 10 of the present embodiment is formed so as to alter the focusing method in response to shooting conditions.

Figure 3:
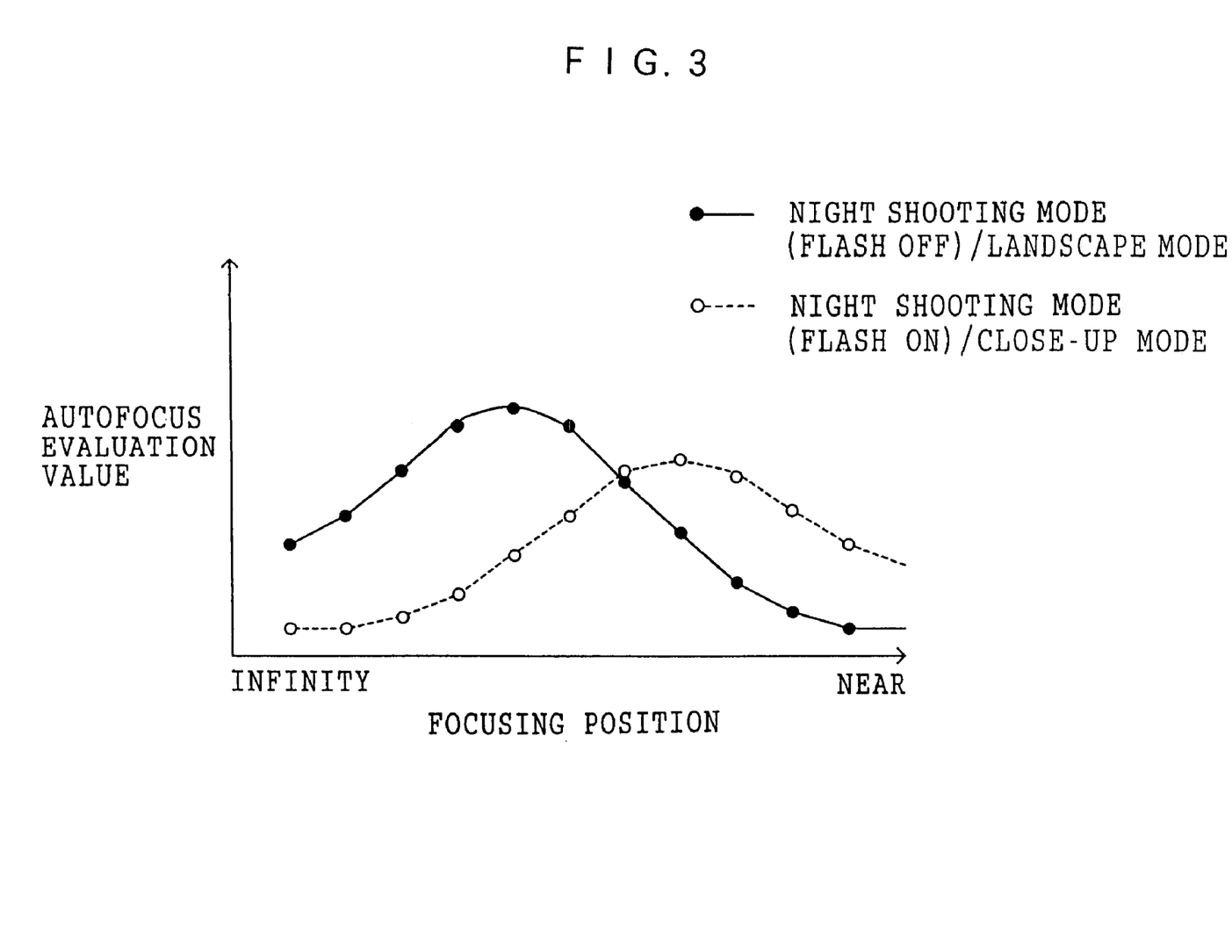
FIG. 3 is a graph showing schematic representations of autofocus searches.
Figure 4A:
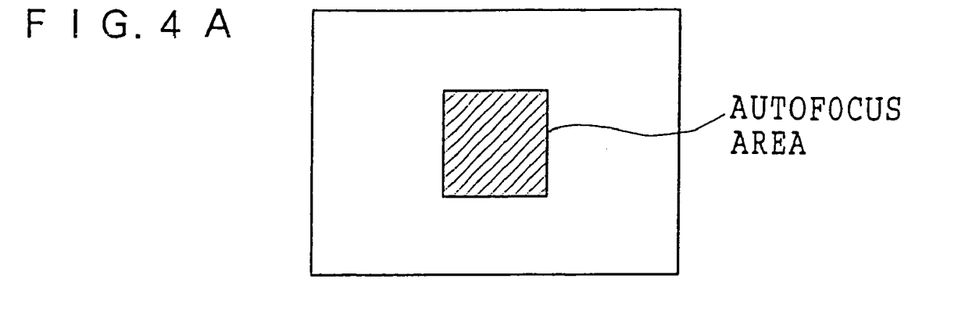
FIGS. 4A to 4D are illustrations showing search areas.
Figure 4B:
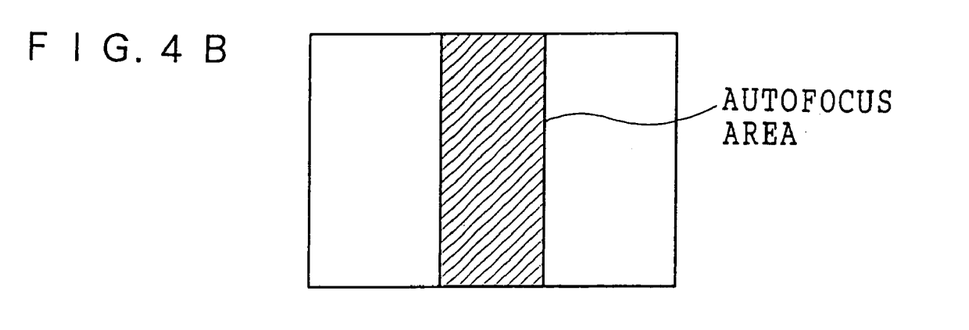
Figure 4C:
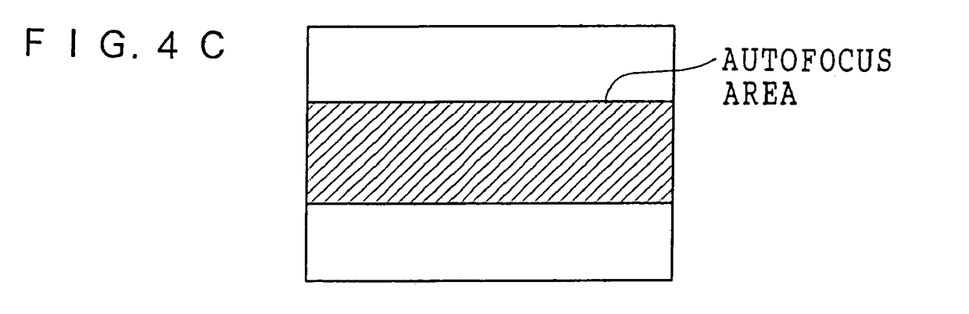
Figure 4D:
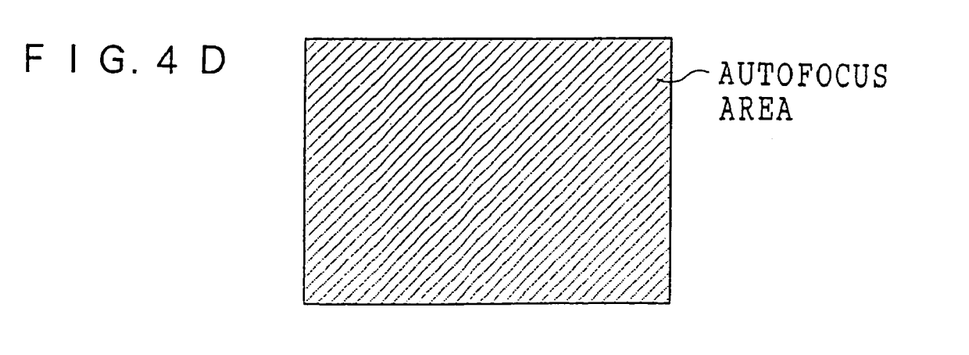

Autofocus searches are often performed when long-range shooting is being carried out, for example, in a landscape mode or in a night shooting mode with the flash off. That is, an in-focus position is near a far position end (Infinity side), as shown by the solid line in FIG. 3. Therefore, an autofocus search can be done in a shorter time and a search of the whole of a search range avoided by setting the far position (Infinity side) as a focus search start position and searching toward a close position end (Close side). Conversely, the in-focus position may, as shown by the dotted line in FIG. 3, be near the close position end (Close side), for example, in night shooting mode with the flash on, portrait shooting, macro shooting (close-up mode) and the like. Accordingly, the autofocus search can be done in a shorter time, and the in-focus position found without searching the whole of the search range, by setting the close position (Close side) as the focus search start position and searching toward the far position end (Infinity side).

Moreover, in the digital camera 10 of the present embodiment, a plurality of search areas have been fixed as autofocus search areas in advance, as shown in FIGS. 4A through 4D. Focusing is performed by searching respective search areas. In the present embodiment, the fixed plurality of areas is area A, area B, area C and area D.

In a focusing determination method, it is decided whether an autofocus evaluation value acquired by the autofocus search is optimal or not. Judgement is made on the basis of conditions shown below.

a) Difference between a peak autofocus evaluation value and an autofocus evaluation value of a position of predetermined defocusing (a position at which blurring clearly occurs).

b) Absence of two or more peak values.

c) Alignment of peak autofocus evaluation value positions for the plurality of areas.

Figure 5A:
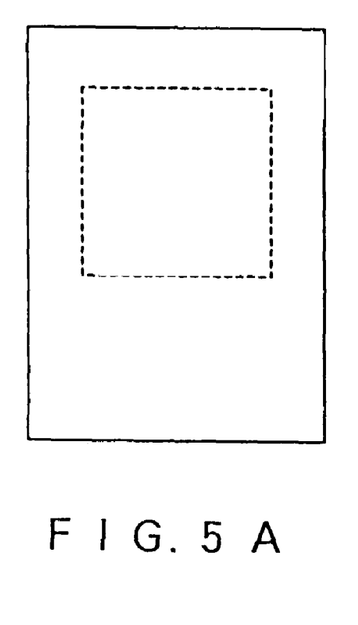
FIGS. 5A to 5C are illustrations showing shooting frames.
Figure 5B:
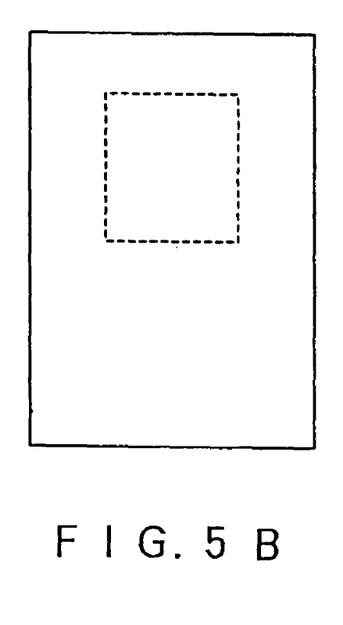
Figure 5C:
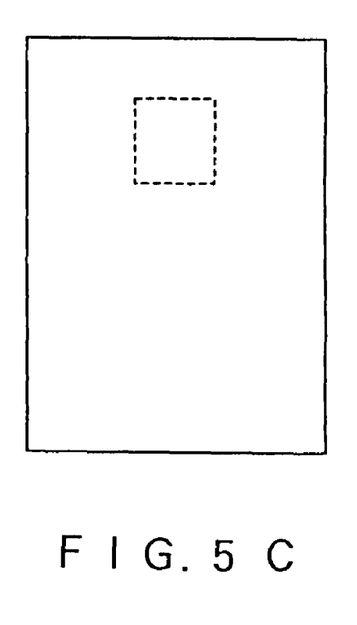

However, if the subject has low contrast, low lightness or the like, it may not be possible to find the in-focus position even with a search of the whole of the autofocus search range and autofocus becomes impossible. In this case, the photographer is given a warning that focusing is impossible, and focus is set to a subject range that is most frequent in shooting or a shot is taken with the focus set to a pan focus position. For example, the focus is set to a subject shooting distance that is anticipated to have a high frequency for a particular mode; in portrait mode, the focus is set to a distance corresponding to a photographic frame as shown in one of FIGS. 5A through 5C. Three portrait frames (PR) that serve as shooting frames are shown in FIGS. 5A through 5C: a head-shot frame (see FIG. 5A), a bust-length shot frame (see FIG. 5B) and a knee-length shot frame (see FIG. 5C).

Now, table 1 shows examples of the above-described autofocus function (relationships between shooting modes and autofocus operation).

TABLE 1

| Mode | | | | Autofocus operation | | | |
|---|---|---|---|---|---|---|---|
| Shooting mode | Closeup | Flash | Frame | Search direction | Search range | When search fails | Autofocus areas |
| Auto/Manual/Continuous/Action | Off | — | None/other | Close→Far | ∞-0.8 m | NG1 | A, B, C |
| | | | Group photo | Close→Far | ∞-0.8 m | NG2 | A, B, C |
| | | | Portrait | Close→Far | ∞-0.8 m | NG3 | A, B, C |
| | On | — | — | Close→Far | 0.8-0.25 m | NG4 | A, B, C |
| Portrait | Off | — | None | Close→Far | ∞-0.8 m | NG3 | A, B, C |
| | | | Portrait (head-shot) | Close→Far | ∞-0.5 m ∞-0.8 m | NG5 | A, B, C |
| | | | Portrait (bust-length shot) | Close→Far | ∞-0.8 m | NG6 | A, B, C |
| | | | Portrait (knee-length shot) | Close→Far | ∞-0.8 m | NG7 | A, B, C |
| Landscape | Off | — | — | Far→Close | ∞-0.8 m | NG8 | A, B, C, D |
| Night Scene | Off | Off | — | Far→Close | ∞-0.8 m | NG1 | A, B, C, D |
| | | On | — | Close→Far | ∞-0.8 m | NG1 | A, B, C |

When a search fails, focusing is performed as described in one of NG1 through NG8 below.

NG1: Zoom at wide-angle, focus at approx. 2 m

NG2: Zoom at wide-angle, focus at a distance corresponding to a group photo frame NG3: Zoom at wide-angle, focus at usual portrait photography distance NG4: Zoom at wide-angle, focus at approx. 0.4 m NG5: Zoom at wide-angle, focus at a distance whereat a face is in the head-shot frame NG6: Zoom at wide-angle, focus at a distance whereat a face is in the bust-length shot frame NG7: Zoom at wide-angle, focus at a distance whereat a face is at the knee-length shot frame NG8: Zoom at wide-angle, focus at infinity Now, operation of the autofocus function in a digital camera 10 structured as described above will be explained with reference to the flowchart of FIGS. 6A and 6B.

Figure 6A:
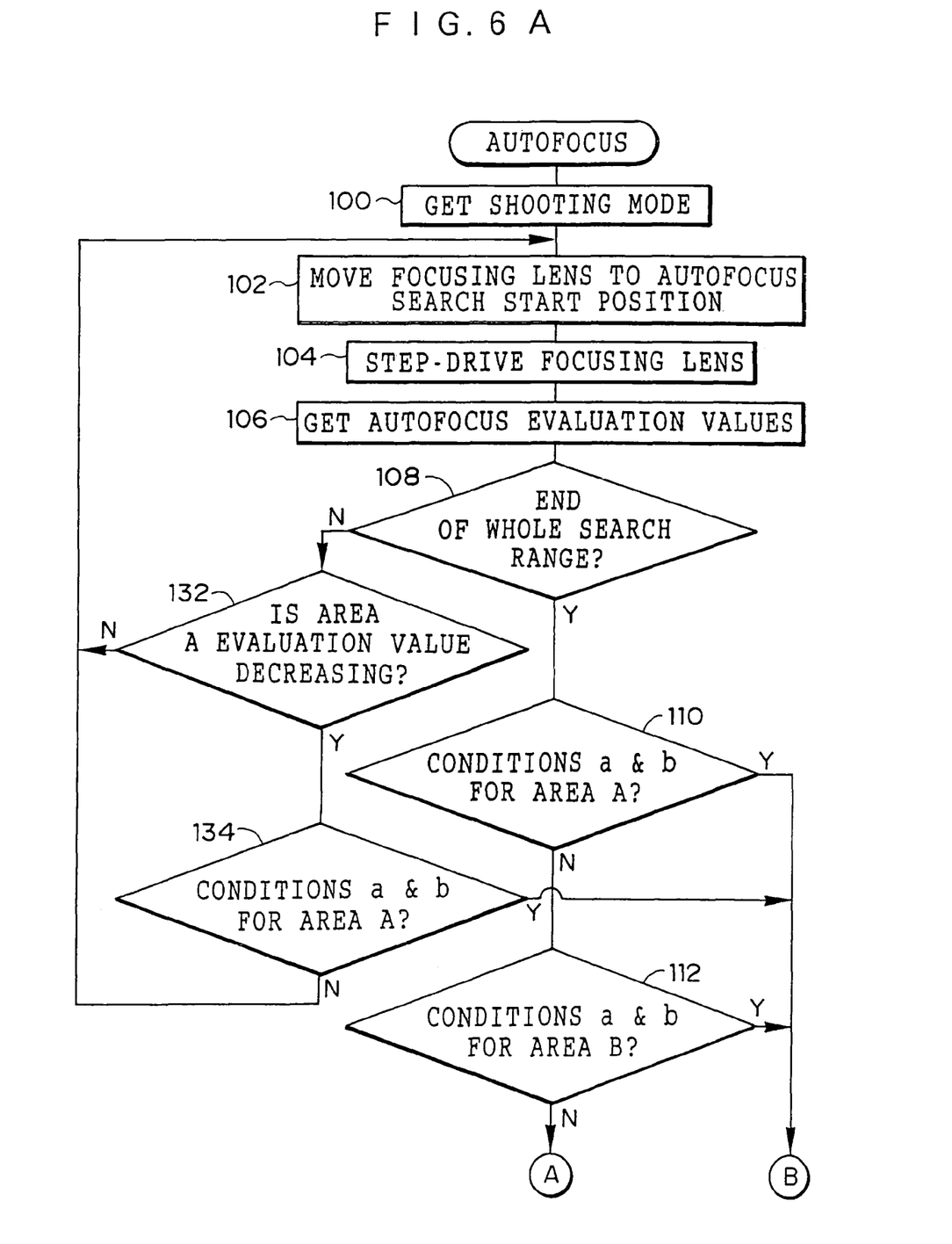
FIGS. 6A and 6B are a flowchart for explaining operation of an autofocus function in the digital camera relating to the embodiment of the present invention

The autofocus function operates when the shutter button 22 of the digital camera 10 is half-pressed. In step 100, the current shooting mode is acquired. In this acquisition, a shooting mode that was pre-selected by photographer operation of various buttons is acquired.

In step 102, the focusing lens 40 is moved to an autofocus search start position in accordance with the acquired shooting mode. In step 104, the focusing lens 40 is step-driven from the autofocus search start position and the autofocus search begins. In the digital camera 10 of the present embodiment, the autofocus search direction and autofocus search range are fixed in advance in accordance with the shooting mode, as described above. Consequently, the autofocus search can find the in-focus position in a short time; i.e., the time required for the autofocus search can be reduced.

In step 106, autofocus evaluation values produced by the autofocus search are ongoingly acquired. In step 108, whether or not the whole of the autofocus search range has been completed is determined. If the determination is positive, control passes to step 110 and it is determined whether or not conditions a and b have been satisfied for area A. Condition a is a case in which it is judged that the peak autofocus evaluation value is sufficiently large, after comparing a predetermined value (a fixed value (EEPROM parameter) stored in advance in a ROM or the like included in the CPU 42) with the difference between the peak autofocus evaluation value and the autofocus evaluation value at the position of predetermined defocusing. The larger the autofocus evaluation value, which is proportional to subject contrast, the more positive the judgement. Condition b is a case in which there is no autofocus evaluation value larger than an autofocus evaluation value of a peak value position +1 (adjacent to the peak value position at a close side thereof) within a predetermined range toward the close side therefrom and in which there is no autofocus evaluation value larger than an autofocus evaluation value of a peak value position −1 (adjacent to the peak value position at a far side thereof) within a predetermined range toward the far side therefrom. In a case in which the autofocus evaluation values of a slightly unfocused position adjacent to the peak position (the peak position is almost always judged to be the in-focus position) and the position of predetermined defocusing (the position at which blurring clearly occurs) are similar, it can be assumed that either a lot of information besides contrast information is included in the autofocus evaluation values or that the search area includes subjects at different distances. If the autofocus search range is short enough, the latter case is very unusual.

If the result of step 110 is negative, control passes to step 112. In step 112, it is determined whether or not conditions a and b have been satisfied for area B. If the result thereof is negative, control passes to step 114. In step 114, it is similarly determined whether or not conditions a and b have been satisfied for area C. If the result thereof is negative, control passes to step 116.

In step 116, the shooting mode is judged. If the result is negative, control passes to step 118 and it is determined whether or not the shooting mode is one of landscape mode and night mode with flash off. If the result is positive, control passes to step 120.

Figure 6B:
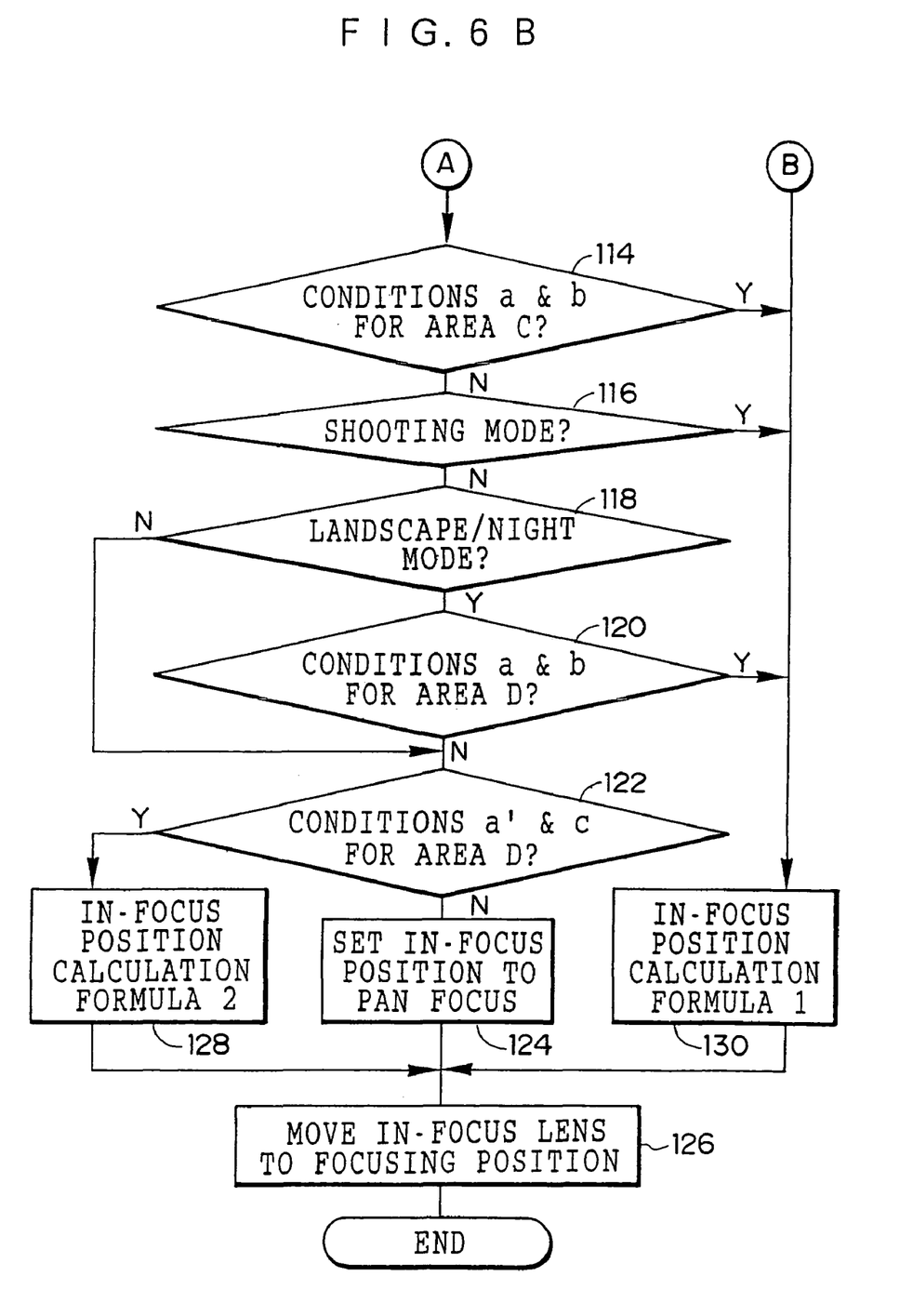

In step 120, it is determined whether or not conditions a and b have been satisfied for area D. If the judgement is negative, control passes to step 122 and it is determined whether or not conditions a' and c have been satisfied for area D. Condition a' is a case in which it is judged that the autofocus evaluation value is sufficiently large, after comparing a predetermined value (a fixed value (EEPROM parameter) stored in advance in a ROM or the like included in the CPU 42) with the difference between the peak autofocus evaluation value and a minimum autofocus evaluation value. The larger the autofocus evaluation value, which is proportional to subject contrast, the more positive the judgement. Condition c is a case in which autofocus evaluation value peak positions of areas A, B and C are within a predetermined range of each other, which range is provided by a focus pulse number (an EEPROM parameter) set for each zoom position. If the autofocus evaluation values are not sufficiently large, it is difficult to distinguish contrast information in the autofocus evaluation values from noise. However, if the autofocus evaluation value peak positions for the different search areas are nearly the same as each other, it can be judged that there is sufficient contrast information included in the autofocus evaluation values that represent that peak position.

If the judgement of step 122 is negative, control passes to step 124, the focusing position is set to a pan focus position, the focusing lens 40 is moved to that focusing position in step 126 and this cycle of the autofocusing process ends. The pan focus position is a preset focusing position (a focus set in advance) for when autofocusing is determined to be impossible for the shooting mode, as shown in table 1 above. Accordingly, resistance of focusing to autofocus failures can be improved.

Meanwhile, if the result of step 118 is negative, control passes directly therefrom to step 122.

Further, if the result of step 122 is positive, control passes to step 128 and in-focus position calculation equation 2 is performed. In-focus position calculation equation 2 determines an average value of the peak positions of each area (in-focus position=(area A peak position+area B peak position+area C peak position)/3). The focusing lens 40 is moved to a calculated in-focus position in step 126 and this cycle of the autofocusing process ends.

Meanwhile, if the result of one of steps 110, 112, 114, 116 and 120 is positive, the in-focus position is at a position in whichever area conditions a and b have been satisfied for. Thus, control passes to step 130 and in-focus position calculation equation 1 is performed. The focusing lens 40 is moved to a calculated in-focus position in step 126 and this cycle of the autofocusing process ends.

Figure 7:
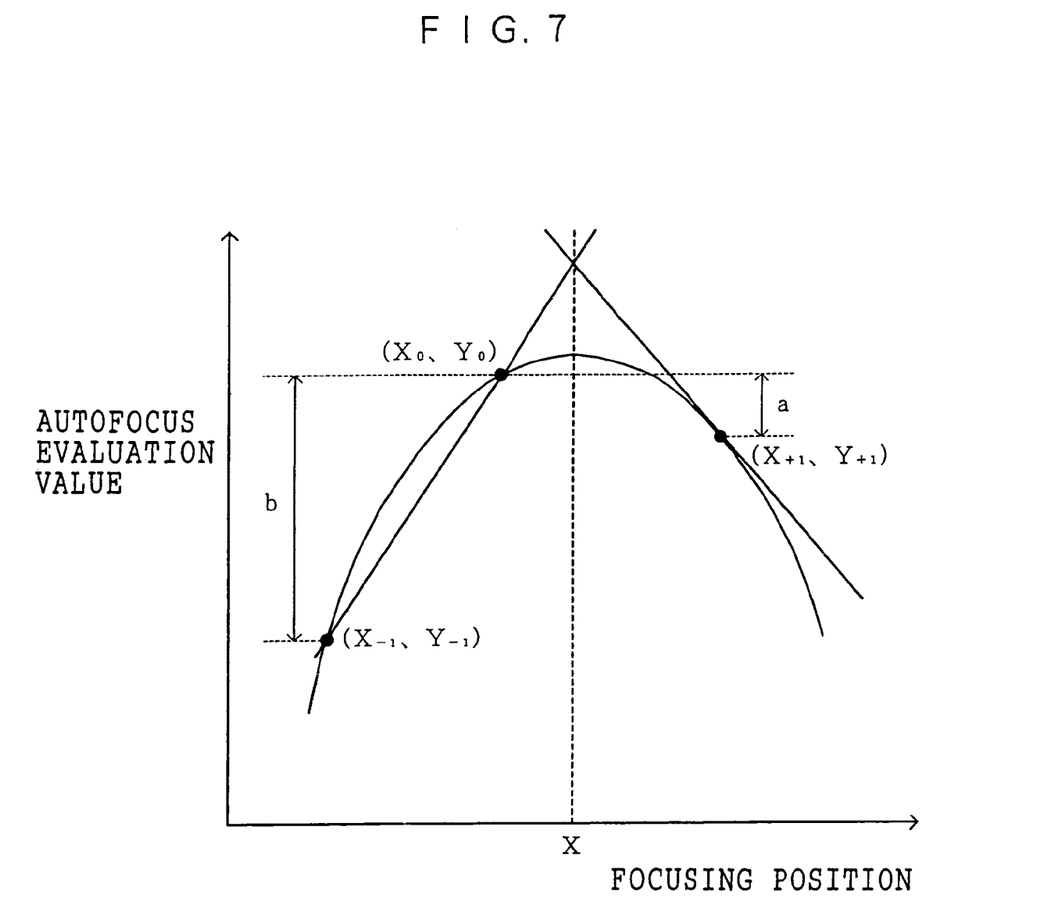
FIG. 7 is a graph for explaining in-focus position calculation equation 1.

In-focus position calculation equation 1 calculates a true peak position by interpolation from the focusing position of the largest autofocus evaluation value acquired and focusing positions adjacent thereto.

As shown in FIG. 7, the focusing position of the largest autofocus evaluation value acquired and that autofocus evaluation value are designated $(X_0, Y_0)$. The focusing positions adjacent to focusing position $X_0$ and autofocus evaluation values thereof are designated $(X_{-1}, Y_{-1})$ and $(X_{+1}, Y_{+1})$. If a value b ($b=Y_0-Y_{-1}$) is greater than or equal to a value a ($a=Y_0-Y_{+1}$) (see FIG. 7), a true peak value X is calculated by an interpolation formula $X=X_0+d$ wherein $d=0.5-a/2b$. If value b is less than value a, the true peak value X is calculated by an interpolation formula $X=X_0-d$ wherein $d=0.5-b/2a$.

When the result of step 108 is negative, control passes to step 132 and it is determined whether or not autofocus evaluation values of area A are on a decreasing trend. If the result is negative, control returns to step 102 and the process repeats from step 102 as described above.

If the result of step 132 is positive, control passes to step 134 and it is determined whether or not conditions a and b have been satisfied for area A, in the same manner as in step 110. If the result is negative, control returns to step 102 and the process repeats from step 102 as described above. If the result of step 134 is positive, control passes to the above-described step 130, in-focus position calculation equation 1 is performed, and this cycle of the autofocusing process ends.

Thus, in the digital camera 10 of the present embodiment, by altering the autofocus search start position, the autofocus search direction, the autofocus search range, the autofocus area and the preset focusing position for when autofocus is impossible in accordance with the shooting mode, the time required for autofocusing can be shortened and focusing resilience can be improved.

The present embodiment was explained for the digital camera 10 as an example. However, the present embodiment is applicable to all imaging devices that have autofocus functions.

In the present invention as described above, an in-focus position search start point, searching direction, search range and focus judgement method are decided in accordance with predetermined conditions. Consequently, the present invention has the effects of shortening focus searching search times and enabling correct focusing in accordance with shooting conditions.

The invention claimed is:

1. A device for forming an image of a subject, the device comprising:
   (a) a focusing lens having an optical axis, with the focusing lens being movable along the optical axis for focusing an image of the subject at an imaging position;
   (b) a motor connected to the focusing lens, operable for causing the focusing lens to move along the optical axis;
   (c) an image sensor having a sensing surface located at the imaging position, which produces electronic information in accordance with images on the sensing surface; and
   (d) a central processing unit electronically connected to the image sensor and receiving electronic information from the image sensor, and electronically connected to and controlling the motor, the central processing unit having a memory and program logic, in which the program logic in accordance with a predetermined first set of conditions stored in the memory, the predetermined first set of conditions having been set in advance, determines a start point of a search and one of two directions of search from the start point for an in-focus position of an image of the subject on the imaging position, and controls operation of the motor to move the focusing lens to the start point, and to move the focusing lens from the start point in the determined direction of search until an in-focus position is reached based on analyzing an autofocus evaluation value calculated from electronic information received from the image sensor, and stops the search for an in-focus position of an image if each of a predetermined second set of conditions are satisfied,
   wherein the predetermined first set of conditions includes at least one of: status of the flash, magnitude of brightness, magnitude of contrast, and ambient light levels, and the predetermined second set of conditions includes:
   an autofocus evaluation value at a current search position being a peak value; difference between the peak autofocus evaluation value and the autofocus evaluation value of predetermined defocusing being greater than a predetermined threshold; and absence of two or more peak autofocus evaluation values within a predetermined range around the current search position.

2. A device for forming an image of a subject according to claim 1,
   wherein the focusing lens is movable forward and back along the optical axis, and the program logic determines, in accordance with the predetermined conditions, to search one of forward and back from the start point along the optical axis for an in-focus position.

3. A device for forming an image of a subject according to claim 1,
   wherein the program logic determines, in accordance with the predetermined conditions, a range for the search.

4. A device for forming an image of a subject according to claim 1,
   wherein the program logic determines, in accordance with the predetermined conditions, a method of determination of an in-focus position.

5. The device of claim 4, wherein the method of an in-focus position is defined by at least one of an auto focus condition, an auto focus set in advance and auto focus area.

6. A device for forming an image of a subject according to claim 1,
   wherein, when the search for an in-focus position is unsuccessful, the program logic, in accordance with the predetermined conditions, controls the motor to move the focusing lens to a focusing position stored in advance in the memory.

7. The device of claim 1, wherein the predetermined conditions are photographic modes including at least a close-up mode, a landscape mode and a night scene mode.

8. The device of claim 7, wherein an in-focus position is predetermined to be at one of a close position side and a far position side depending on the photographic mode, and, if the in-focus position is predetermined to be at the close position side, the start point is the close position and the search proceeds toward the far position and, if the in-focus position is predetermined to be at the far position side, the start point is the far position and the search proceeds toward the close position.

9. The device of claim 1, wherein the program logic calculates the predetermined second set of conditions for at least one of a plurality of autofocus areas in the order of increasing area, and stops the search for an in-focus position of an image once the autofocus area for which the predetermined second set of conditions is satisfied is found.

10. The device of claim 1, wherein if the predetermined second set of conditions is not satisfied for any of the autofocus areas, then the program logic either sets the focus to a pan focus, or sets the in-focus position to an average of peak positions of the autofocus evaluation value associated with the plurality of autofocus areas.

11. A focusing method for use in an imaging device for focusing an image of a subject at an imaging position using a focusing lens movable along an optical axis, the method comprising the steps of:
    (a) determining, in accordance with a predetermined first set of conditions, the predetermined first set of conditions having been set in advance, a start point from which to move the focusing lens along the optical axis in searching for an in-focus position and one of two directions of search from the start point;
    (b) positioning the focusing lens at the start point; and
    (c) moving the focusing lens along the optical axis from the start point in the determined direction of search, searching for an in-focus position and stops the searching if each of a predetermined second set of conditions are satisfied,
    wherein the predetermined conditions includes at least one of: status of the flash, magnitude of brightness, magnitude of contrast, and ambient light levels and the predetermined second set of conditions includes:
    an autofocus evaluation value at a current search position being a peak value; difference between the peak autofocus evaluation value and the autofocus evaluation value of predetermined defocusing being greater than a predetermined threshold; and absence of two or more peak autofocus evaluation values within a predetermined range around the current search position.

12. A focusing method for use in an imaging device for focusing an image of a subject at an imaging position using a focusing lens movable along an optical axis according to claim 11, the method further comprising the step of:

determining, in accordance with the predetermined conditions, a direction to search from the start point along the optical axis for an in-focus position.

13. A focusing method for use in an imaging device for focusing an image of a subject at an imaging position using a focusing lens movable along an optical axis according to claim 11, the method further comprising the step of:

determining, in accordance with the predetermined conditions, a range for the search.

14. A focusing method for use in an imaging device for focusing an image of a subject at an imaging position using a focusing lens movable along an optical axis according to claim 11, the method further comprising the step of:

determining, in accordance with the predetermined conditions, a method for deciding whether an in-focus position has been reached.

15. The method of claim 14, wherein the method of an in-focus position is defined by at least one of an auto focus condition, an auto focus set in advance and auto focus area.

16. The focusing method of claim 11, wherein, if the search for an in-focus position is unsuccessful, the focusing lens is moved, in accordance with the predetermined conditions, to a default focusing position.

17. The focusing method of claim 11, wherein the predetermined conditions are photographic modes including at least a close-up mode, a landscape mode and a night scene mode.

18. The focusing method of claim 17, wherein an in-focus position is predetermined to be at one of a close position side and a far position side depending on the photographic mode, and, if the in-focus position is predetermined to be at the close position side, the start point is the close position and the search proceeds toward the far position and, if the in-focus position is predetermined to be at the far position side, the start point is the far position and the search proceeds toward the close position.

19. A computer program product for use in focusing an image of a subject at an imaging position in an imaging device having a computer, wherein the computer controls movement of a focusing lens along an optical axis, the product comprising a recording medium having recorded thereon electronically readable information which, when used to program the computer, causes the computer to:

(a) determine, in accordance with a predetermined first set of conditions, the predetermined first set of conditions having been set in advance, a start point from which to move the focusing lens along the optical axis in searching for an in-focus position and one of two directions of search from the start point;

(b) position the focusing lens at the start point; and (c) move the focusing lens along the optical axis from the start point in the determined direction of search, searching for an in-focus position and stops the searching if each of a predetermined second set of conditions are satisfied, wherein the predetermined conditions includes at least one of: status of the flash, magnitude of brightness, magnitude of contrast, and ambient light levels and the predetermined second set of conditions includes:

an autofocus evaluation value at a current search position being a peak value; difference between the peak autofocus evaluation value and the autofocus evaluation value of predetermined defocusing being greater than a predetermined threshold; and absence of two or more peak autofocus evaluation values within a predetermined range around the current search position.

20. A computer program product according to claim 19 wherein the electronically readable information, when used to program the computer, further causes the computer to determine, in accordance with the predetermined conditions, a direction to search from the start point along the optical axis for an in-focus position.

21. A computer program product according to claim 19 wherein the electronically readable information, when used to program the computer, further causes the computer to determine, in accordance with the predetermined conditions, a range for the search.

22. A computer program product according to claim 19 wherein the electronically readable information, when used to program the computer, further causes the computer to determine, in accordance with the predetermined conditions, a method for deciding whether an in-focus position has been reached.

23. The computer program product of claim 22, wherein the method of an in-focus position is defined by at least one of an auto focus condition, an auto focus set in advance and auto focus area.

24. A computer program product according to claim 19 wherein the electronically readable information, when used to program the computer, if the search for an in-focus position is unsuccessful, includes causing the computer, in accordance with the predetermined conditions, to move the focusing lens to a default focusing position.

25. The computer program product of claim 19, wherein the predetermined conditions are photographic modes including at least a close-up mode, a landscape mode and a night scene mode.

* * * * *